3,504,091
METHOD OF COMBATTING FUNGI WITH N,N DI-
ALKYL SUBSTITUTED DITHIOCYANOANILINES
Stig Hjalmar Johannes Akerstrom, Bofors, Sweden, and
Albert Tempel, Van Houtenlaan, Weesp, Netherlands,
assignors, by mesne assignments, to U.S. Philips Cor-
poration, New York, N.Y., a corporation of Delaware
No Drawing. Filed Oct. 6, 1965, Ser. No. 493,567
Int. Cl. A01n 9/18
U.S. Cl. 424—302                                    3 Claims

ABSTRACT OF THE DISCLOSURE

Dialkylamino-dithiocyanoanilines as fungicides. An ex-
ample is N,N-dimethyl-2,4-dithiocyano-aniline.

---

This invention relates to a new and improved method
of controlling plant harmful fungi and to novel agents
useful therefor.

A principal object of this invention is to provide a
new and novel compound capable of controlling plant
harmful fungi with a minimum degree of phytotoxic
activity.

Another principal object of our invention is to provide
a new and improved method of controlling plant harmful
fungi.

These and other objects of our invention will be appar-
ent from the description that follows:

It is known from the Belgian Patent 629,566 that aro-
matic amines which contain a thiocyano substituent in the
phenyl nucleus have a strong herbicidal activity and can
be used for the defoliation of plants.

According to our invention we have surprisingly found
that a certain group of aromatic amines which contain
two thiocyano substituents in the phenyl nucleus have a
good fungicidal activity and, in contrast with the corre-
sponding monothiocyano compounds, have such a low
phytotoxicity that the said compounds may even be used
for the control of plant harmful fungi.

More particularly we have found that the novel com-
pounds of the Formula I or an acid addition salt thereof:

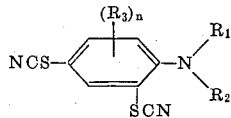

wherein the symbols $R_1$, $R_2$ and $R_3$, which may have the
same or different meanings, represent alkyl groups of
1–4 carbon atoms and $n=0$, 1 or 2, are very useful in
combatting plant harmful fungi while being relatively
non-phytotoxic.

As acid addition salts of the novel amines of our in-
vention, there may be employed for example, salts of
inorganic acids, such as hydrochloric acid or sulphuric
acid, alphatic acids, for example acetic acid or acrylic
acid, aromatic acids, for example, benzoic acid or substi-
tuted benzoic acids.

The fungicidal activity of the novel compounds of our
invention was determined in experiments in which vari-
ous types of fungi were used as test organisms. In this
experiment there was found a particularly strong fungi-
cidal activity against fruit attacking fungi, such as *Ven-
turia inaequalis*, the organism causing apple scab and
*Podosphaera leucotricha*, the organism causing powdery
mildew of apples.

The agents according to our invention may be formu-
lated according to the known procedures for such agents
in which the fungicidal substance is mixed with or dis-
solved in a solid or liquid diluent to which a surface-active
agent or a sticker may be added. Thus may be provided
dusts, smoke generators, aerosols, wettable powders and
emulsifiable liquid concentrates. The resultant wettable
powders and emulsifiable liquid concentrates are diluted
with water shortly prior to application by spraying.

The concentration of the active substance in the fungi-
cidal composition of our invention vary within very wide
limits, for example, up to 95% by weight in a wettable
powder, which contains, for example, in addition to the
active substance only a dispersing agent and as little as
0.001% by weight in an aqueous liquid to be sprayed.

Dusts, according to our invention may be obtained by
intimately grinding together the active substance of For-
mula I with an inert solid diluent, for example in a con-
centration of from 1 to 50% by weight. As examples of
suitable solid diluents that may be employed are talcum,
kaolin, pyrophyllite, diatomaceous earth, calcium car-
bonates, dolomite, gypsum, chalk, bentonite, attapulgite,
ground walnut or pecan shells and mixtures of these and
similar substances.

Wettable powders of our invention contain the active
substances of Formula I and at least one dispersing agent.
Examples of such dispersing agents are lignin sulphonates
and the alkyl naphthylsulfonates. A wetting agent is pref-
erably also used, for example fatty alcohol sulphates.
Other examples of such wetting agents are alkylarylsul-
phonates or fatty acid condensation products including
"Igepon." For example a wettable powder may be obtained
by mixing the active substance with 1–5 parts by weight
of a dispersing agent, 1–5 parts by weight of a wetting
agent, and 10–80 parts by weight of one of a solid diluent.

Water miscible oils may be prepared by dissolving or
dispersing the active ingredient in a water immiscible
liquid and adding an emulsifier to the resultant mixture.
Suitable solvents that may be employed include ali-
phatic hydrocarbons such as alcohol, kerosene, fuel oils
or diesel fuel; aromatic hydrocarbons such as xylene,
heavy aromatic naphtha or coal tar oils and oxygenated
solvents such as isophorone, cyclohexanol, dimethyl
formamide, dimethyl sulforide, mesityl oxide and mixtures
thereof.

Emulsifiers may be used that include for example, alkyl-
phenoxypolyglycolethers, polyoxyethylene sorbitan esters
of fatty acids or polyoxyethylenesorbitolesters of fatty
acids or calcium or amine salts of alkyl benzene sulfonic
acids and many others. The concentration of the active
ingredient in these water miscible oils is not restricted
to narrow limits and may vary, for example between 2
and 85% by weight.

In addition to the wettable powders and water miscible
oils there may be prepared water miscible highly concen-
trated primary solutions of the active substance in water
miscible liquids, for example, acetone, to which solution
is added a dispersing agent and, if desired, a wetting
agent.

When diluted with water shortly before or during spray-
ing, an aqueous dispersion of the active substance is
formed.

The spraying or atomization of fungicidal compositions
of our invention may be carried out in a known manner
and in a suitable concentration which is adapted to the
particular condition during use. This is not restricted to
narrow limits and may lie, for example, between 0.01 and
5% and as a rule between 0.01 and 0.5% by weight.

An aerosol preparation according to our invention may
be obtained in normal manner by incorporating the active
substance, if required in a solvent and an inert gas as a
propellant, for example, the mixture of chloro-fluoro
derivatives of methane and ethane commercially avail-
able under the trade name Freon are suitable propellants.

Smoke generators or fumigating candles, i.e. prepara-
tions which can generate a fungicidal smoke while burn-
ing, may be obtained by incorporating the active ingredient of our invention in a combustible mixture which may contain, for example, as a fuel, a sugar or a wood, preferably in a finely divided form, a substance for maintaining combustion such as ammonium nitrate or potassium chlorate, and in addition a substance delaying combustion, such as kaolin, bentonite and/or colloidal silicic acid and mixtures thereof.

In addition to the foregoing ingredients, the fungicidal compositions of our invention may contain other substances known for use with this type of composition. For example, a lubricant, calcium or magnesium stearate, may be added to a dust. Alternatively, e.g., "adhesives" for example polyvinyl alcohol cellulose derivatives or other colloidal materials such as casein, may be added to improve the adherence of the fungicidal agent to the surface to be protected.

If desired, other pesticidal substances, e.g., insecticides, acaricides or other fungicides may be incorporated in the compositions of our invention.

A few examples of compositions of our invention are:

EXAMPLE 1

| | Parts by wt. |
|---|---|
| N,N-dimethyl-2,4-dithiocyanoaniline | 25 |
| Kaolin | 55 |
| Sodium caseinate | 10 |
| Sodium ligninesulphonate (commercial name Polyfon H.) of West Virginia Pulp and Paper Co. | 7 | and 3 parts by weight of sodium oleyl-N-methyltaurate were ground in a mill to form a wettable powder.

EXAMPLE 2

A water emulsifiable concentrate was obtained by mixing 25 parts by weight of N,N-diethyl-2-4-dithiocyanoaniline together with 5 parts by weight of a mixture (1:1) of alkyl phenol polyglycol ether and calcium dodecyl benzene suphonate in 70 parts by weight of xylene.

EXAMPLE 3

A smoke generator was prepared containing 16 g. of N,N-dimethyl-2,4-dithiocyano-5-methylaniline, 15 g. of sandal wood, 12 g. of wood dust, 3 g. of colloidal silicic acid, 4 g. of bentonite and 40 g. of ammonium nitrate.

EXAMPLE 4

A dust was obtained by grinding 3 g. of N,N-dimethyl-2,4-dithiocyanoaniline together with 5 g. of attapulgite, 10 g. of sodium caseinate and 82 g. of talc.

Variations both in the composition of the agents and in the use thereof are well known in the field of fungicides and it is also known that it is impossible to define absolute limits for the quantities of fungicidal agents to be employed under all conditions. In general, the application of 0.02–10 g. of the active substance per square meter will be fungicidally effective. When spraying plants a quantity of from 0.2–8 kg. per ha. will be sufficient as a rule.

The activity against *Venturia inaequalis* was determined for example in a spore germination test. In this test, N,N-dimethyl-2,4-dithiocyanoaniline at a concentration as low as $10^{-5.6}$ mg./ml. still showed complete inhibition of germination.

The activity against powdery mildew of the fungicidal compositions of our invention was determined in vitreo and experiments in which cucumber seedlings of the variety *Gele tros* with well developed horizontally spread cotyledons were sprayed with suspensions of the compound to be tested in various concentrations; 5 ml. of the suspensions were sprayed over a surface of 1000 cm.$^2$ on which the cucumber seedlings had been placed. After the spray liquid had dried the plants were placed in a glass house and infected with dry spores of *Sphaerotheca fuliginea* originating from infected plants. The infection was assessed after 2–3 weeks when the cotyledons of the untreated control plants which had been infected in the same manner were overgrown with powdery mildew.

It was found that when using:

N,N-dimethyl-2,4-dithiocyanoaniline
N,N-diethyl-2,4-dithiocyanoaniline or
N,N-dimethyl-2,4-dithiocyano-5-methylaniline in a concentration of 3000 p.p.m. of active material in a spray liquid, complete control of the powdery mildew was accomplished with little or no damage to the plant.

It has been found that in particular, N,N-dimethyl-2,4-dithiocyanoaniline has a strong activity.

Corresponding monothiocyano compounds showed such a strong phytotoxicity that an anti-mildew activity could not be demonstrated in these experiments.

What we claim is:

1. A method of controlling fungi on living plants comprising treating said plants with a fungicidally effective amount of N,N-dimethyl-2,4-dithiocyanoaniline or an acid addition salt thereof.

2. A method of controlling fungi on living plants comprising treating said plants with a fungicidally effective amount of N,N-diethyl-2,4-dithiocyanoaniline or an acid addition salt thereof.

3. A method of controlling fungi on living plants comprising treating said plants with a fungicidally effective amount of N,N-diethyl-2,4-dithiocyano-5-methyl-aniline or an acid addition salt thereof.

References Cited

UNITED STATES PATENTS

| 3,285,730 | 11/1966 | Weis et al. | 71—2.3 |
| 2,077,479 | 4/1937 | Hollander et al. | 260—99.1 |
| 2,024,098 | 12/1935 | Heckert | 424—302 |

OTHER REFERENCES

Soderback, Erik, ACTA Chemica Scand., 8 (1954), No. 10, p. 1851–1858.

FRANK CACCIAPAGLIA, Primary Examiner
J. V. COSTIGAN, Assistant Examiner

U.S. Cl. X.R.
424—42, 45